Figure 1:
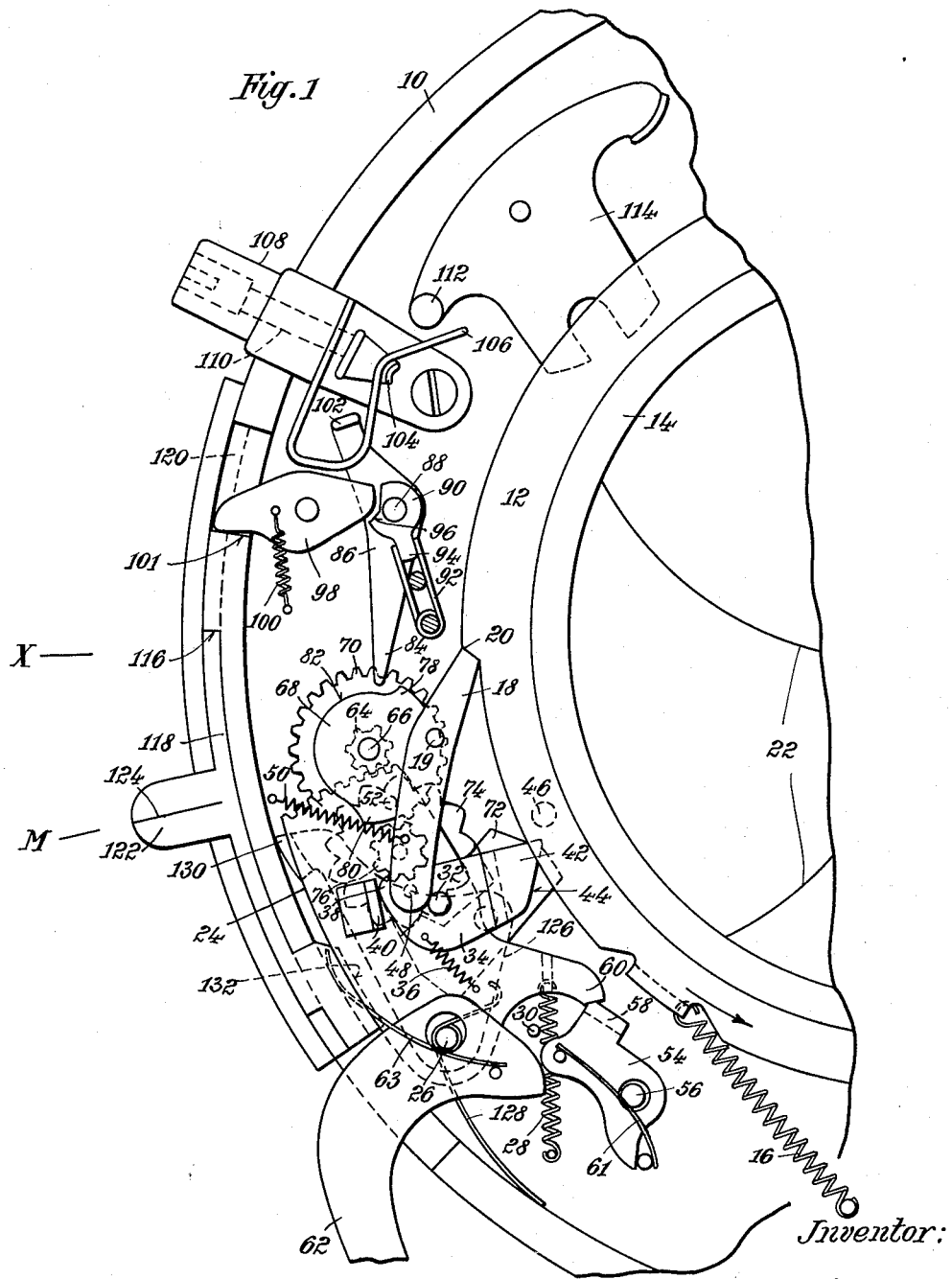

Aug. 16, 1955  K. GEBELE  2,715,357
PHOTOGRAPHIC OBJECTIVE CLOSING DEVICE
WITH A FLASHBULB SYNCHRONIZER
Filed Sept. 4, 1951  2 Sheets-Sheet 1

Inventor:
Kurt Gebele,
by John B. Brady
Attorney

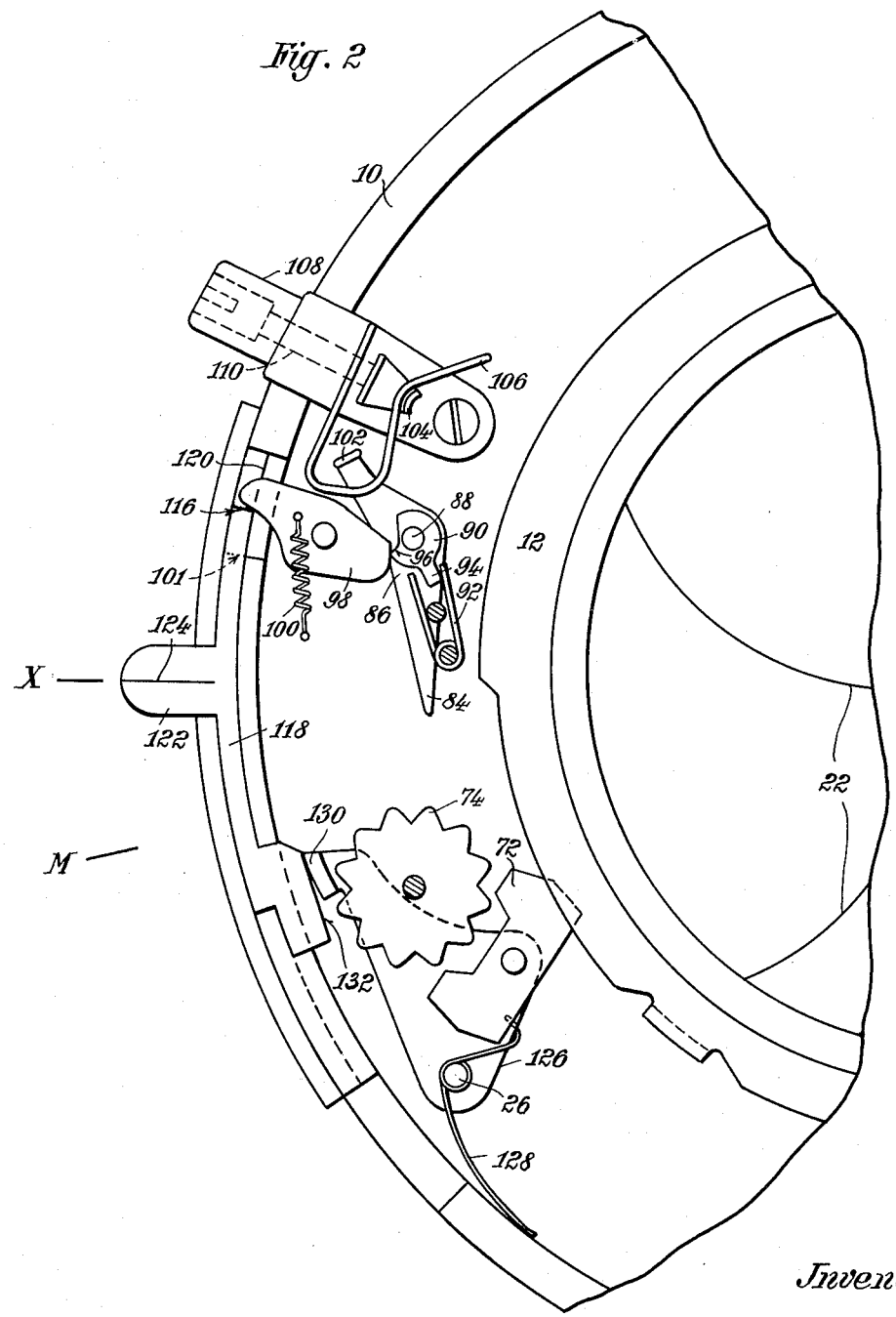

United States Patent Office 2,715,357
Patented Aug. 16, 1955

2,715,357

PHOTOGRAPHIC OBJECTIVE CLOSING DEVICE WITH A FLASHBULB SYNCHRONIZER

Kurt Gebele, Munich, Germany, assignor to Friedrich Wilhelm Deckel, Post Tutzing, and Hans Deckel, Munich-Solln, Germany Application September 4, 1951, Serial No. 245,017

3 Claims. (Cl. 95—11.5)

The invention relates to a photographic objective closing device with a flashbulb synchronizer which after its release runs a certain distance and in so doing actuates a contact device for the flashbulb and also brings about the release of the closing device.

In closing devices of this kind there occurs between the instant of release of flashbulb synchronizer and the instant of the opening of the closing device a certain time interval which is determined by the preconnected running distance of the flashbulb synchronizer. Depending on the construction, this may be as much as 40 ms. This fact is often very disadvantageous, because, for example when taking photographs of very rapidly moving objects (technical or sports pictures), it may lead to failures because the object has moved out of the picture area during the interval after the release.

This disadvantage is eliminated according to this invention in that the interval for the running distance of the flashbulb synchronizer can be reduced approximately to zero.

My invention will be more fully explained in the specification hereinafter following with reference to the accompanying drawings in which:

Figure 1 shows the closing device in tensioned position for exposures with a flashbulb having substantial delay; and Fig. 2 shows another adjustment of the closing device with certain of the parts omitted.

In the arrangement of the mechanism of my invention as set forth in Figs. 1 and 2, I provide a main driving organ, such as a tensioning ring 12 mounted in a housing 10 in such a way that it can rotate about the objective tube 14. Ring 12 is maintained under the influence of a spring 16 and can be moved counter to the action thereof from its inoperative position into the position according to Fig. 1, being maintained in the tensioned position by a pawl 18 whch is mounted at 19 on the frame (not shown) of the closing device and cooperates with a hook or recess 20 of the tensioning ring 12. When the pawl 18 releases the tensioning ring 12, the latter runs down or rotates in the direction of the arrow (according to Fig. 1) and causes the opening and closing of the shutter leaves 22 by conventional means as indicated for example in United States Letters Patent 1,687,123 to Friedrich Deckel and Martin Geiger, dated October 9, 1928, assignors to the firm, Friedrich Deckel Prazisionsmechanik und Maschinenbau, of Munich, Bavaria, Germany.

A toothed segment 24 acting as synchronizer is mounted for oscillation about the axis 26 in the housing 10 and is under the influence of a spring 28 which strives to maintain it applied against a stop 30 in clockwise direction. On the synchronizer 24 there is mounted for rotation at 32 an engaging pawl 34 which is maintained under the influence of a spring 36 which strives to displace the engaging pawl 34 in a counterclockwise direction and to pull its nose 38 against an upwardly bent abutment 40 of the synchronizer 24. Another nose 42 of the engaging pawl 34 or its inclined face 44 can come into the path of a pin 46 on the tensioning ring 12.

The pawl 18 is provided with an engaging pin 48 which lies above the engaging pawl 34 without, however, engaging therewith; but it may engage with the abutment 40 of the synchronizer 24 which projects into the zone of movement of this engaging pin 48. The pawl 18 is furthermore maintained under the influence of a spring 50 which strives to pull it in a clockwise direction against an abutment pin 52 mounted—like the pawl 18 itself—on the frame (not shown) of the closing device.

In the housing 10 there is, moreover, mounted for rotation about a pin 56, a pawl 54, in such a way that it is movable above the synchronizer 24. The pawl 54 presents a downwardly bent lug 58 which projects into the zone of movement of the synchronizer 24 and can cooperate with a nose 60 thereof. A weak spring 61 strives to turn the pawl 54 in a counterclockwise direction and to press it against a releasing lever 62 which is mounted for rotation about the axis 26 of the synchronizer 24 and is under the action of a spring 63.

The teeth on the synchronizer 24 mesh with a toothed wheel 64 which is mounted at 66 for rotation in the housing 10. Coaxial with the toothed wheel 64 and rigidly connected therewith, there is a cam member 68 and another toothed wheel 70. The movements of the toothed wheel 70 are checked by an anchor 72 with escapement 74 of conventional type and method of operation, which parts are in operative connection with the toothed wheel 70 over an intermediate wheel 76.

The cam member 68 is provided with two control cams 78 and 80 offset at approximately 180 degrees and formed by the termination of a cavity 82 at the periphery of the cam member 68. Into the cavity 82 of the cam member 68 there projects an arm 84 of a double-arm switch lever 86 which is mounted for rotation at 88 in the housing 10. During a rotational movement of the cam member 68 the arm 84 is turned by said control cams 78, 80 in one direction or the other, as will be explained in detail later. A tipping means 90 is fastened on the switch lever 86; a spring 92 cooperates with a nose 94 of the tipping means 90 and strives to maintain the tipping means 90 together with the switch lever 86 in the central position shown in Fig. 1. The tipping means 90 presents a surface 96 which cooperates with a reversing lever 98, in a manner that on turning the reversing lever 98 from the position shown in Fig. 1 in clockwise direction, the reversing lever 98 applies against the surface 96 and turns the tipping means 90 together with the switch lever 86 counter to the action of thte spring 92 in counterclockwise direction, so that the arm 84 of the switch lever 86 is moved out of the zone of the cam member 68 (Fig. 2). It should be mentioned also that the reversing lever 98 is under the influence of a spring 100 which strives to keep it in the position as shown in Fig. 1, in which it applies against a stop 101 of the housing 10.

A second arm 102 of the double-arm switch lever 86 actuates a contact device arranged in the housing 10. This contact device consists of two contact members, namely of a fixed contact member 104 and an elastically movable contact member 106. The connection of the contact members 104, 106 to a flashbulb device, not shown, occurs through a contact box 108 fastened in the housing 10, in such a way that the one pole is connected with the contact spring 106 through the mass of the contact box 108, while the other pole is in current-carrying connection with the contact part 104 through an intermediate member 110 arranged in insulated relation to the contact box 108. For a given position of the switch lever 86 the contact spring 106 is applied by its arm 102 against the contact member 104 and the circuit of the flashbulb device is closed.

It should be mentioned also that the contact spring 106—as will be explained later—may be actuated by another part, for example by the arm 112 of the angle lever 114 of the closing mechanism itself and a contact may be established from that side. The connection between lever 114 and the shutter mechanism is conventional as shown for example in Patent 1,687,123, supra.

The reversing lever 98 is actuated by a projection 116 of a reversing organ 118 which is slidable with self-retention in a guide slot 120 of the housing 10. This reversing organ 118 presents a handle 122 having a mark 124 which cooperates with a marking M and X at the periphery of the housing 10.

The described arrangement functions as follows: When a photograph is to be taken with the flashbulb, that is, with the use of a flashbulb with great flash delay, the switch lever 98 should be placed in the position according to Fig. 1 by the respective adjustment of the reversing organ 118, 122 in position "M," and the contact members 104 and 106 should be connected with the flashbulb device by inserting in the box 108 a plug (not shown) connected to a cable. Then the closing device must be brought from the inoperative position into the tensioned position according to Fig. 1. The closing device is tensioned by rotation of the tensioning ring 12 in a clockwise direction, so that its spring 16 is tensioned. During this movement the pin 46 of the tensioning ring 12 hits the surface 44 of the engaging pawl 34; since the engaging pawl 34 meshes with the synchronizer 24 over 38, 40, the synchronizer 24 is turned during this tensioning movement in a counterclockwise direction, its spring 28 being tensioned. Shortly before completion of the tensioning operation the pin 46 leaves the pawl 34, 44 and the synchronizer 24 is held in the tensioned position by the pawl 54, the lugs 58 of which take support on the nose 60, as Fig. 1 indicates. The tensioning ring 12 is then moved for an additional small distance, until the pawl 18 snaps in behind the stop of the nose 20 of the tensioning ring 12 and holds the latter in the tensioned position.

During this tensioning movement of the synchronizer 24 and of the closing device the toothed wheels 64, 70 and the cam member 68 are rotated over the teeth of the synchronizer 24 into the position according to Fig. 1. At the same time the arm 84 of the switch lever 86 is turned by the control cam 80 in a counterclockwise direction out of its central position and its one arm 102 moved away the contact spring 106. The switch lever 86 remains in the outside position until its arm 84 leaves the periphery of the cam member 68 and can again enter the cavity 82 behind the control cam 78 and resume its central position (Fig. 1). During the tensioning operation, therefore, the arm 102 of the switch lever 86 actuating the contact spring 106 has not come into contact therewith, on the contrary, it has been turned away therefrom. The establishment of a closed circuit during the tensioning operation is thereby reliably avoided.

Release occurs by actuation of the release lever 62 by the operator, this lever being turned in a counterclockwise direction. At the same time the pawl 54 meshing therewith is turned in a clockwise direction until its abutment lug 58 releases the nose 60 of the synchronizer 24. Under the influence of its spring 28 the synchronizer 24 thereupon begins to run in a clockwise direction and in so doing sets into rotation also the cam member 68. The running movement of these parts is checked by the retaining mechanism 72, 74. Immediately after beginning of the rotary movement of the cam member 68, its control cam 78 turns the switch lever 84, 86 in a clockwise direction, its arm 102 pressing the contact spring 106 against the contact member 104, establishing a current-carrying connection with the flashbulb device.

After a certain distance has been run, the stop 40 of the synchronizer 24 hits the pin 48 of the pawl 18 and turns the latter in a counterclockwise direction so that the tensioning ring 12 is released and runs down under the influence of its spring 16 in the direction of the arrow in Fig. 1. This causes an opening and closing of the shutter leaves 22 in the known manner. In the open position of the sectors the flash delay of the flashbulb has elapsed after establishment of contact, so that this bulb produces a flash and illumination of the photo-sensitive layer takes place.

During the running down of the tensioning ring 12 its pin 46 hits the nose 42 of the engaging pawl 34, which meanwhile again projects into its zone of movement. The engaging pawl is then turned counter to its spring 36 in a clockwise direction (without disturbing the running movement of the synchronizer 24), until it slips the pin 46. Upon completion of the exposure and of the running movement, the parts resume their inoperative position.

When taking photographs with a flashbulb which presents little or no delay of the flash, the contact must not be established until during the opening of the shutter leaves 22. For this reason the reversing organ 118, 122 must in such a case be placed in position "X," the reversing lever 98 assuming the position according to Fig. 2. The switch lever 86 is then turned over the tipping means 90, 96 from its central position in a counterclockwise direction until its arm 84 moves outside of the path of the cam member 68, 78, 80 and its other lever arm 102 leaves the zone of the contact spring 106. The method of operation of the device is otherwise the same as described above, with the only difference that the switch lever arms 84, 96, 102 are inoperative and the actuation of the contact spring 106 occurs through a running part of the closing mechanism itself, in the present case through the arm 112 of the angle lever 114, immediately after the opening of the shutter leaves 22.

It results from the above that between the time of actuation of the releasing lever 62 and the time of the opening of the shutter sectors 22 there elapses a relatively long interval, which is given by the preconnected running distance of the flashbulb synchronizer 24. To exclude this factor when photographing rapidly moving objects, a simple arrangement is provided which makes it possible according to the invention to reduce the interval for the running distance of the flashbulb synchronizer 24 approximately to zero.

The effect of this arrangement consists mainly in that the anchor 72 can be disengaged from the escapement 74. For this purpose the anchor 72 is mounted on a supporting plate 126 which is mounted below the flashbulb synchronizer 24 for rotation about the pin 26 thereof. The supporting plate 126 is maintained under the influence of a spring 128 which strives to maintain a projection 130 of the supporting plate 126 applied against the housing 10 and to insure the engagement of the anchor 72 in the escapement 74.

When the reversing organ 118 is set on X, a control cam 132 thereof engages with the projection 130 of the supporting plate 126 and causes by the turning thereof the disconnection of the anchor 72 (Fig. 2). With this arrangement the flashbulb synchronizer 24 can run down without impediment in a time of about 2–3 ms., which is practically equivalent to zero. With this adjustment it is therefore possible to photograph rapidly moving objects, not only without flashbulb but also with flashbulbs without delay of flash.

It should be mentioned also that the control cam 132 of the switch organ 118 may have a gradual rise, so that during its displacement a successive turning of the supporting plate 126 would be achieved. This would make it possible to adjust the engagement of the anchor 72 in the escapement 74 to any desired depth and to regulate the degree of the retention to obtain different times of the flashbulb synchronizer 24 and thus to take into consideration different ignition times of the flashbulbs.

While I have described my invention in certain preferred embodiments I realize that modifications may be made and I desire that it be understood that no limitations upon my invention are intended other than may imposed by the scope of the appended claims.

What I claim as new and desire to secure by Letters Patent of the United States is as follows:

1. In a mechanism of the class described, a photographic objective closing device having a housing, an exposure opening in said housing, a plurality of shutter blades movable between closed and open positions, a master member movable between tensioned and run-down positions to cause an opening and closing movement of said shutter blades, a releasable latching member movably mounted in said housing to hold said master member in its tensioned position, a flashbulb circuit arranged in said housing, a contact device in said flashbulb circuit, a switch member arranged in said housing and movable to close said contact device in said flashbulb circuit, a settable synchronizer member having a predetermined run-down time interval and actuating during its run-down movement said switch member to close said contact device in said flashbulb circuit and thereafter actuating said latching member to cause the release and the run-down movement of said master member and thereby to cause the movement of said shutter blades for opening and closing the exposure opening, a retention mechanism in permanent engagement with said synchronizer member to delay its run-down movement, said retention mechanism including an escapement and an oscillable anchor cooperating with said escapement, and adjustable means for effecting a disengagement of said anchor with said escapement, whereby the retention effect of said retention mechanism and thus the time interval of the run-down movement of said synchronizer member is reduced approximately to zero.

2. A photographic objective closing device as set forth in claim 1, further including an adjustable reversing member cooperating with said switch member for setting said switch member into operation, the adjustment of said reversing member by setting said switch member into operation effecting also the disengagement of said anchor with said escapement.

3. A photographic objective closing device as set forth in claim 1, further including an adjustable reversing member cooperating with said switch member for setting said switch member into operation, the adjustment of said reversing member by setting said switch member into operation effecting also the disengagement of said anchor with said escapement, and in which said housing contains a peripheral guide slot, said reversing member being adjustable in said guide slot, and a double-armed reversing lever pivoted at the center thereof, with one arm thereof extending in the path of adjustment of said reversing member and the other arm thereof coacting with said switch member, and in which said anchor is carried by a supporting plate member pivotally mounted in said housing and displaceable by a control cam on said adjustable reversing member, whereby the adjustment of said reversing member for setting said switch member into operation simultaneously effects the displacement of said supporting plate member and thereby the disengagement of said anchor with said escapement.

References Cited in the file of this patent

UNITED STATES PATENTS

| | | |
|---|---|---|
| 2,404,526 | Pirwitz | July 23, 1946 |
| 2,472,580 | Fuerst | June 7, 1949 |
| 2,480,604 | Pirwitz | Aug. 30, 1949 |